(12) United States Patent
Schenkel et al.

(10) Patent No.: US 9,161,429 B2
(45) Date of Patent: Oct. 13, 2015

(54) COMPACT ION SOURCE NEUTRON GENERATOR

(75) Inventors: Thomas Schenkel, San Francisco, CA (US); Arun Persaud, El Cerrito, CA (US); Rehan Kapadia, Berkeley, CA (US); Ali Javey, Emeryville, CA (US); Constance Chang-Hasnain, Palo Alto, CA (US); Ivo Rangelow, Baunatal (DE); Joe Kwan, Castro Valley, CA (US)

(73) Assignee: The Regents of the University of California, Oakland, CA (US)

( * ) Notice: Subject to any disclaimer, the term of this patent is extended or adjusted under 35 U.S.C. 154(b) by 533 days.

(21) Appl. No.: 13/451,475

(22) Filed: Apr. 19, 2012

(65) Prior Publication Data

US 2013/0044846 A1    Feb. 21, 2013

Related U.S. Application Data

(60) Provisional application No. 61/477,927, filed on Apr. 21, 2011.

(51) Int. Cl.
*G21G 4/02* (2006.01)
*H05H 3/06* (2006.01)
*H05H 6/00* (2006.01)

(52) U.S. Cl.
CPC . *H05H 3/06* (2013.01); *H05H 6/00* (2013.01); *G21G 4/02* (2013.01)

(58) Field of Classification Search
CPC ........................................................ G21G 4/02
See application file for complete search history.

(56) References Cited

U.S. PATENT DOCUMENTS

| 8,709,350 | B2 | 4/2014 | Schenkel et al. |
| 2009/0046823 | A1 | 2/2009 | Edwards et al. |
| 2011/0169492 | A1* | 7/2011 | Groves .......................... 324/333 |

OTHER PUBLICATIONS

Brochure for Mantis MGC75.*
Srikanth Ravipati, Chang-Jung Kuo, Jiann Shieh, Cheng-Tung Chou, Fu-Hsiang Ko, "Fabrication and enhanced field emission properties of novel silicon nanostructures," Microelectronics Reliability 50 (2010) 1973-1976.*
A. Persaud et al. A compact neutron generator using a field ionization source. Review of Scientific Instruments, 83, Feb. 15, 2012, pp. 02B312-1-02B312-4.
A. Persaud et al. Development of a compact neutron source based on field ionization processes. Journal of Vacuum Science and Technology B, vol. 29, No. 2, Mar./Apr. 2011, pp. 02B107-1-02B107-4.
Arun Persaud et al., abstract for CAARI 2012, "Field Ionization Studies for Compact Neutron Sources," Aug. 10, 2010.
(Continued)

*Primary Examiner* — Jack W Keith
*Assistant Examiner* — Sean P Burke
(74) *Attorney, Agent, or Firm* — Lawrence Berkeley National Laboratory

(57) ABSTRACT

A neutron generator includes a conductive substrate comprising a plurality of conductive nanostructures with free-standing tips and a source of an atomic species to introduce the atomic species in proximity to the free-standing tips. A target placed apart from the substrate is voltage biased relative to the substrate to ionize and accelerate the ionized atomic species toward the target. The target includes an element capable of a nuclear fusion reaction with the ionized atomic species to produce a one or more neutrons as a reaction by-product.

14 Claims, 3 Drawing Sheets

(56) References Cited

OTHER PUBLICATIONS

Arun Persaud et al., Vacuum Nanoelectronics Conference (IVNC), 2010 23rd International, "Development of a Compact Neutron Source Based on Field Ionization Processes," pp. 107-108, Jul. 26, 2010.

B. Naranjo, J. K. Gimzewski, and S. Putterman, Nature 434, 1115 (2005).

I. W. Rangelow and S. Biehl, J. Vac. Sci. Technol. B 19, 916 (2001).

J.M. Bonard, N. Weiss, H. Kind, T. Stockli, L. Forro, K. Kern, and A. Chatelain, Advanced Materials 13, 184 (2001).

S. H. Jo, Y. Tu, Z.P. Huang, D.L. Carnahan, D.Z. Wang, and Z.F. Ren, Appl. Phys. Lett. 82, 3520 (2003).

U.S. Office Action for U.S. Appl. No. 13/451,459 mailed Nov. 4, 2013.

Notice of Allowance and Issue Fee Due for U.S. Appl. No. 13/451,459, mailed Feb. 28, 2014.

\* cited by examiner

COMPACT ION SOURCE NEUTRON GENERATOR

RELATED APPLICATIONS

This application claims priority from Provisional Patent Application Ser. No. 61/477,927 filed Apr. 21, 2011, and this application incorporates by reference all subject matter contained in that provisional patent application.

STATEMENT REGARDING FEDERALLY SPONSORED RESEARCH OR DEVELOPMENT

This invention was made with government support under Contract No. DE-AC02-05CH11231 awarded by the United States Department of Energy to The Regents of the University of California for management and operation of the Lawrence Berkeley National Laboratory. The government has certain rights in this invention.

BACKGROUND

1. Field

The present disclosure relates to neutron generators, and more particularly, to nanostructure electrodes for producing ions to be accelerated for neutron generation.

2. Description of Related Art

Neutrons can be used to examine different parameters of geological formations in borehole logging. For oil wells it can report important properties such as the porosity of the soil. Currently many radioactive sources are used in the oil-well logging industry. These generate neutrons in a radioactive decay. A common material used is an americium-beryllium source. Radiological source replacement programs have the goal to reduce the amount of radioactive sources and replace them with, for example, neutron generators to lower the risk of proliferation and contamination of oil wells and the environment in general as well as reducing health risks for the workers using radioactive sources at the moment. To replace e.g. americium-beryllium sources, neutrons with a similar energy spectrum as the radioactive sources have to be produced. Deuterium and tritium fusion reactions can for example be used for this purpose. Here, deuterium and tritium gas is ionized, accelerated and then interacts with a target that is loaded with, for example, deuterium or tritium. For oil-well logging applications the ion source needs to be small and energy efficient. Current sources used, for example, are Penning sources. Here, a higher electron current is used to ionize gas.

Thus, a new approach of producing high-energy neutrons that is more efficient, smaller in size and has a longer lifetime than current sources is desired. Additionally, the production of neutron with energy greater than 2.5 MeV without the use of tritium would be advantageous.

SUMMARY

A structure and method is disclosed for production of neutrons.

In an embodiment of the disclosure, a neutron generator includes a conductive substrate comprising a plurality of conductive nanostructures with free-standing tips and a source of an atomic species to be introduced in proximity to the free-standing tips. A target placed apart from the substrate is voltage biased relative to the substrate to ionize and accelerate the ionized atomic species toward the target. The target includes an element capable of a nuclear fusion reaction with the ionized atomic species to produce a one or more neutrons as a reaction by-product.

DETAILED DESCRIPTION

Figure 1:
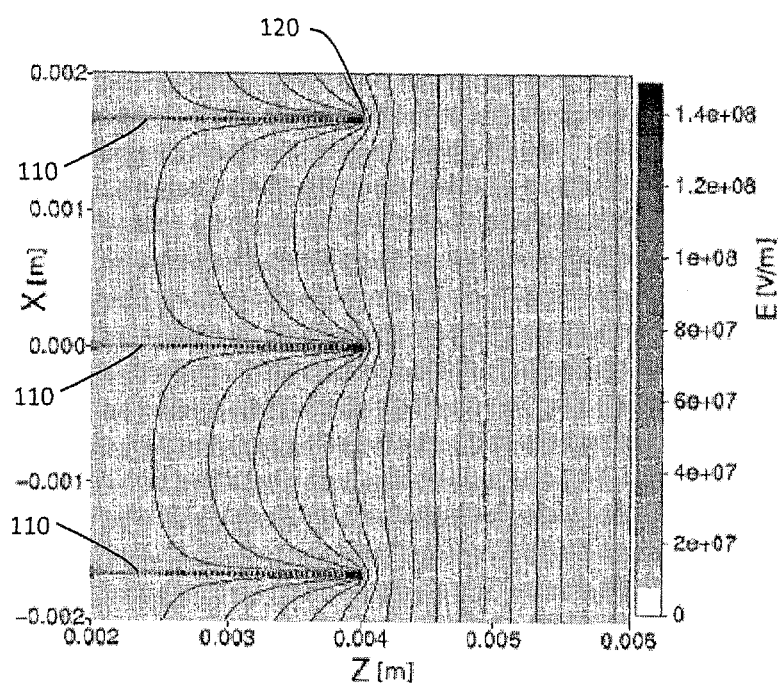
FIG. 1 illustrates a simulation of electric equipotentials near the tips of an embodiment of nanostructures in accordance with the disclosure.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element. In addition, when a first element is "coupled" to a second element, the first element may be directly connected to the second element or the first element may be indirectly connected to the second element with intervening elements between the first and second elements.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the drawings. By way of example, if an apparatus in the drawings is turned over, elements described as being on the "lower" side of other elements would then be oriented on the "upper" side of the other elements. The term "lower" can therefore encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can therefore encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

In particle accelerators, an ion source creates a particle beam. The technology to create ion sources for particle accelerators depends strongly on the type of particle that needs to be generated: electrons, protons, hydrogen ions or heavy ions. Conventional light nuclei ionic sources providing, for example, isotopes of hydrogen may include use of magnetrons, Penning sources, and rf plasma generators. Typically, all three make use of a static magnetic field in some configuration.

Recent developments in compact neutron generators rely on an rf plasma to dissociate and ionize isotopic hydrogen (i.e., hydrogen, deuterium, and tritium) for introduction to an accelerator region, where the energized ions impact a target containing a selected atomic species that undergoes a fusion reaction to liberate neutrons. For example, the reaction $$D+D \rightarrow {}^3He+n(2.45\ MeV)$$

may be obtained by populating a titanium target with imbedded deuterons, which then become targets for subsequent deuteron bombardment. The subsequent capture of the incident deuteron by the target deuteron converts the pair to a $^3$He atom with the release of a 2.45 MeV neutron.

Disclosed is an embodiment of a neutron generator having a compact ionization source that may be applied to accelerators for neutron generation and other application. The disclosed ionization source does not rely on magnetic fields, and may be smaller than conventional ionization sources for such application.

To generate the high fields needed for field ionization use can be made of the fact that a sharp tip, e.g. a single carbon nano-fiber (CNF), in an electric field compresses the equipotential field lines, generating electric fields that are several thousand times stronger than the field gradient in a parallel capacitor geometry. FIG. 1 is a simulation showing the field enhancement effect of an applied voltage at tips of a nanostructure consisting of thin conductive rods 110 approximately 4 mm long and spaced approximately 1.8 mm apart. Near the tips 120 of the nanostructures the equipotentials become very densely compacted, meaning that the electric field increases dramatically. With a sufficient applied voltage, the electric field in close proximity to the nanostructure tips may be sufficient to cause ionization of atoms and molecules. Such field enhancement may result in generating a field of several Volts per Angstrom at the tip by applying an acceleration voltage $V_a$ over a distance of a few centimeters.

Figure 2:
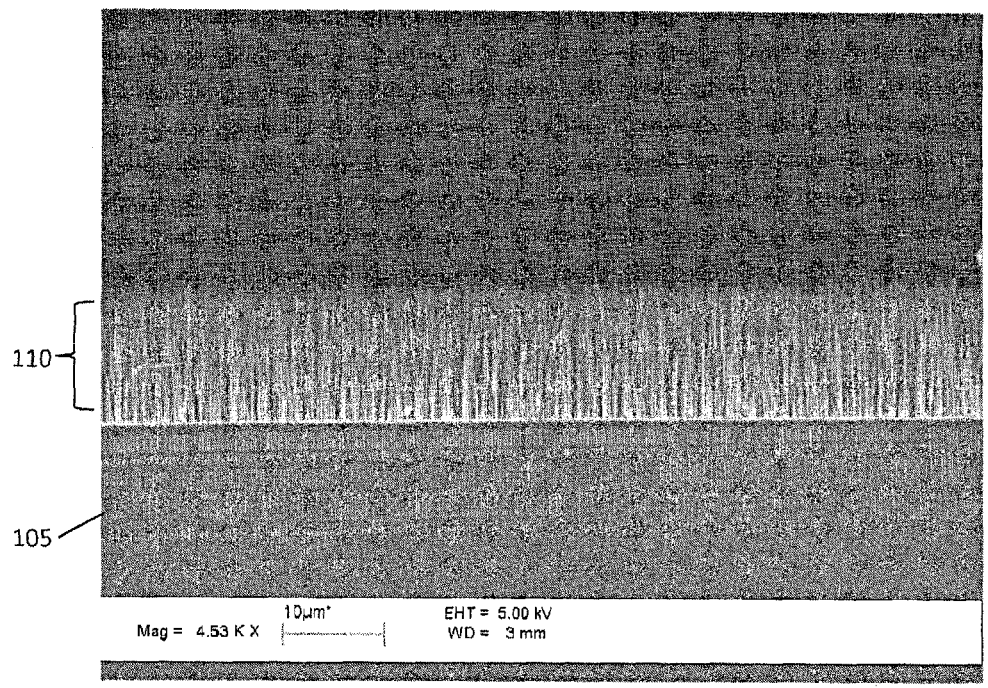
FIG. 2 is a microphotograph of a field of grown carbon nanotubes for field ionization in accordance with the disclosure.

FIG. 2 is a microphotograph of a "forest" of grown carbon nano-fibers (CNFs) for field ionization in accordance with the disclosure. The diameter of the CNFs may be about 70 nm. As can be seen in FIG. 2, the growth results in a relatively uniform height, but single nano-fibers may also extend above the forest. Those tips at a greater height will show the highest field enhancement factors.

Figure 3:
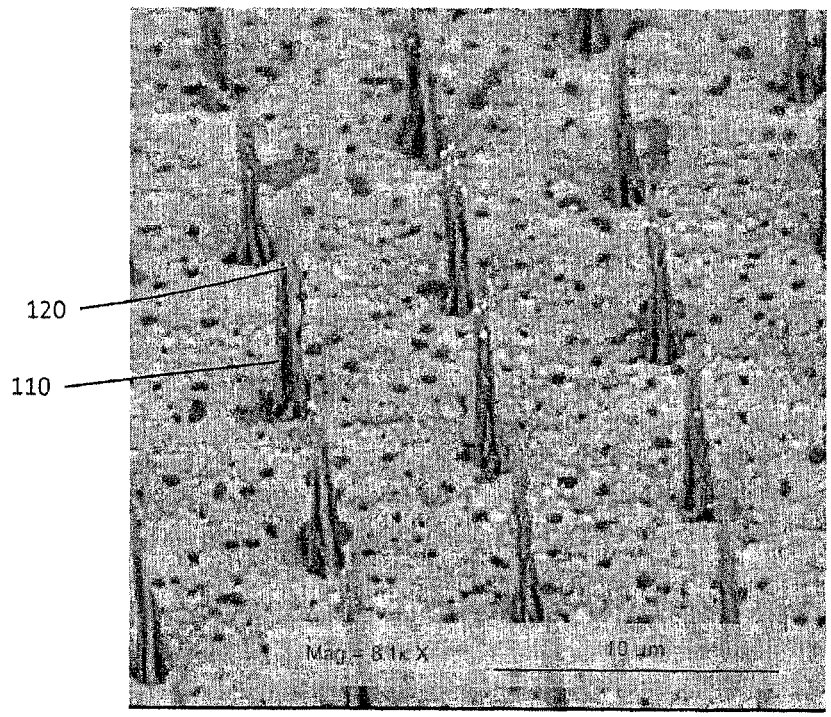
FIG. 3 is a microphotograph of a field of grown carbon nanotubes for field ionization grown in a controlled density pattern in accordance with the disclosure.

FIG. 3 is a microphotograph of a field of CNFs for field ionization using standard photolithographic techniques to establish a seed layer in a regular pattern upon which to grow the array of CNFs. By controlling the spacing between CNFs, a ratio between tip height and tip separation may be optimized for maximum field enhancement at the tips. Whereas the dense growth of CNTs as shown in FIG. 2 can result in tip enhancement being affected by adjacent CNF tips of greater or lesser height, a controlled spacing may enable more uniform field enhancement and optimized field ionization efficiency.

Assuming that the electric field density at the nanostructure tip 120 is sufficient to excite ionization, an ionized molecule or atom may accelerate toward the attracting voltage source. The accelerated species will acquire a kinetic energy according to the applied voltage, and will achieve a velocity v (in a classical approximation) determined by

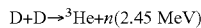

$$E_k = \tfrac{1}{2}mv^2,$$

where m=the mass of the specie, whether the specie is an atom or a molecule. If, for example, the molecular specie is monatomic hydrogen, then the mass is half the mass of a diatomic hydrogen molecule, and therefore the velocity will be increased by a factor $\sqrt{2}$ relative to that of the diatomic hydrogen ion. The increased velocity may have the effect of increasing the cross-section, or efficiency for producing a fusion reaction in a target. For example, neutron generation may be enhanced by promoting the formation of a monatomic specie (rather than, e.g., a diatomic specie) of the ion, whether the atomic specie is hydrogen, deuterium, tritium, or some other nuclear specie.

Figure 4:
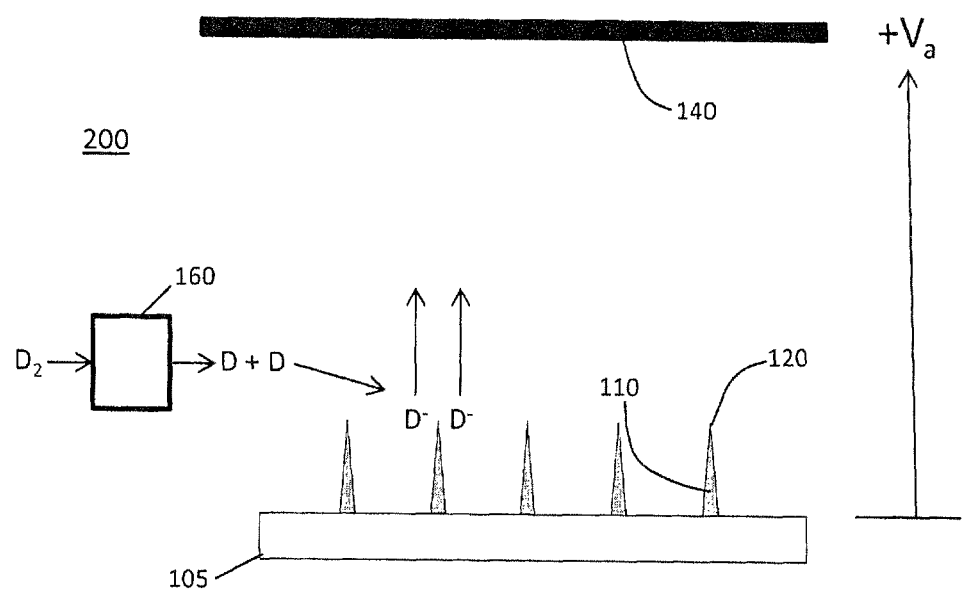
FIG. 4 illustrates an embodiment of an ion acceleration system in accordance with the disclosure.

To enable preferential ionization of a monatomic specie, in FIG. 4 is described an array of conductive nanostructures 110 in proximity to a catalytic gas cracker 160. The catalytic cracker 160, such as a Mantis MGC75 gas cracker source (Mantis Deposition LTD, Oxfordshire, UK) can produce a beam of neutral deuterium with a high monatomic fraction (~80%, up to ~90% for hydrogen, and comparably for tritium). FIG. shows deuterium $D_2$ cracked into monatomic D as an illustrative example.

FIG. 4 is a conceptual embodiment of an ion acceleration system 200 that includes a conductive substrate 115 on which are formed a plurality of nanostructures 110. The nanostructures 110 may be carbon nanotubes (CNTs), silicon nanostructures, silicon carbide nanostructures, GaAs nanostructures, or any material which may be capable of forming thin, conductive, needle-like structures, preferably with sharp tips characterized by a tip radius of curvature that may be on the order of a few nanometers, e.g., as small as 5-10 nanometers, but which may have a smaller radius of curvature or a larger one.

An acceleration voltage $V_a$ may be applied between the conductive substrate 105 and a target electrode 140 placed apart from the substrate. $V_a$ may serve a dual purpose: First, the magnitude of the voltage $V_a$ may be such that the electric field intensity at the nanostructure tip 120 is sufficiently enhanced to cause field ionization of the atomic (and/or molecular) species to ions 116. Second, where the accelerating target electrode 140 is a target including specified nuclei, the magnitude of the voltage $V_a$ may be such that the collision cross-section for neutron production, gamma ray production, or other nuclear reactions, is satisfactory for a selected application, which may depend on the specified nuclei, the selected monatomic ion as well as a magnitude and polarity of $V_a$. The target electrode 140 may be charged up with monatomic hydrogen, deuterium or tritium, or a combination of these isotopes, depending on the application.

The various aspects of this disclosure are provided to enable one of ordinary skill in the art to practice the present invention. Modifications to various aspects of forming nanostructures electrodes presented throughout this disclosure will be readily apparent to those skilled in the art of nanotechnology, particle accelerators, catalytic chemistry, applications to other technical arts, and the concepts disclosed herein may be extended to such other applications. Thus, the claims are not intended to be limited to the various aspects of an ion accelerator presented throughout this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus comprising:
   a conductive substrate;
   a plurality of conductive nanostructures with free-standing tips disposed on the conductive substrate, the plurality of conductive nanostructures comprising nanostructures selected from a group consisting of gallium arsenide nanostructures, silicon carbide nanostructures, and silicon nanostructures;
   a source configured to introduce a gas species proximate the free-standing tips of the plurality of conductive nanostructures;
   a target electrode positioned apart from the conductive substrate, the target electrode configured to be biased relative to the substrate to ionize the gas species and to accelerate ionized gas species toward the target electrode, the target electrode comprising an element capable of a nuclear fusion reaction with the ionized gas species and configured to generate one or more neutrons as a reaction by-product; and
   a vacuum chamber enclosing the conductive substrate and the target electrode.

2. The apparatus of claim 1, wherein the gas species comprises at least one of hydrogen, deuterium, and tritium molecular species.

3. The apparatus of claim 2, further comprising:
   a gas cracker configured to dissociate at least a portion of the gas species to a monatomic gas species prior to ionization of the gas species.

4. The apparatus of claim 1, wherein the ionized gas species is at least one of $H^+$, $H_2^+$, $D^+$, $D_2^+$, $T^+$, $T_2^+$, $H^-$, $H_2^-$, $D^-$, $D_2^-$ and $T_2^-$.

5. The apparatus of claim 1, wherein the target electrode comprises titanium.

6. The apparatus of claim 5, wherein the ionized gas species comprises at least one of $D^+$, $D^-$, $T^+$, and T.

7. A method comprising:
   providing a device comprising:
      a conductive substrate;
      a plurality of conductive nanostructures with free-standing tips disposed on the conductive substrate, the plurality of conductive nanostructures comprising nanostructures selected from a group consisting of gallium arsenide nanostructures, silicon carbide nanostructures, and silicon nanostructures;
      a source configured to introduce a gas species proximate the free-standing tips of the plurality of conductive nanostructures;
      a target electrode positioned apart from the conductive substrate, the target electrode comprising an element capable of a nuclear fusion reaction with an ionized gas species; and
      a vacuum chamber enclosing the conductive substrate and the target electrode;
   bringing a gas species in contact with the conductive substrate and the plurality of conductive nanostructures; and
   applying a bias between the conductive substrate and the target electrode to ionize the gas species, to accelerate ionized gas species toward the target electrode, and to generate one or more neutrons from a reaction between the element and the ionized gas species.

8. The method of claim 7, wherein the gas species comprises at least one of H, D, and T.

9. The method of claim 7, wherein the ionized gas species comprises at least one of $H^+$, $D^+$, $T^+$, $H^-$, $D^-$, and $T^-$.

10. The method of claim 7, wherein the target electrode comprises titanium.

11. The method of claim 10, wherein the ionized gas species comprises $D^+$.

12. The method of claim 11, wherein an energy of a neutron is approximately 2.45 MeV.

13. The method of claim 7, further comprising:
   forming the gas species by dissociating at least a portion of a molecular gas species using a gas cracker.

14. The method of claim 13, wherein the molecular gas species comprises at least one of hydrogen, deuterium, and tritium molecular species.

* * * * *